US011470515B2

(12) United States Patent
Shekhar et al.

(10) Patent No.: US 11,470,515 B2
(45) Date of Patent: Oct. 11, 2022

(54) SELECTION OF SAME USER PLAN FUNCTION FOR USER EQUIPMENT MOVEMENT ACROSS MULTIPLE ACCESS NETWORKS

(71) Applicant: Cisco Technology, Inc., San Jose, CA (US)

(72) Inventors: Ravi Shekhar, Maharashtra (IN); Suyog Subhash Belsare, Maharashtra (IN); Ravi Sankar Mantha, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 154 days.

(21) Appl. No.: 17/089,965

(22) Filed: Nov. 5, 2020

(65) Prior Publication Data
US 2022/0141718 A1 May 5, 2022

(51) Int. Cl.
| | |
|---|---|
| *H04W 36/00* | (2009.01) |
| *H04W 8/08* | (2009.01) |
| *H04W 76/11* | (2018.01) |
| *H04W 36/32* | (2009.01) |
| *H04W 48/16* | (2009.01) |

(52) U.S. Cl.
CPC ......... *H04W 36/0022* (2013.01); *H04W 8/08* (2013.01); *H04W 36/32* (2013.01); *H04W 48/16* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 10,728,817 | B1 | 7/2020 | Kaki et al. |
| 2018/0227743 | A1 | 8/2018 | Faccin et al. |
| 2018/0227815 | A1 | 8/2018 | Sharma |
| 2019/0200266 | A1 | 6/2019 | Jun et al. |
| 2019/0334775 | A1 | 10/2019 | Ghadge et al. |
| 2019/0335365 | A1 * | 10/2019 | Ying ............... H04W 36/32 |
| 2020/0092758 | A1 | 3/2020 | Youn et al. |
| 2020/0092759 | A1 | 3/2020 | Dasgupta et al. |

(Continued)

FOREIGN PATENT DOCUMENTS

| | | | |
|---|---|---|---|
| KR | 102359321 B1 * | 2/2022 | ............ H04W 36/14 |
| WO | 2019134464 A1 | 7/2019 | |

OTHER PUBLICATIONS

Akshay Jain, Elena Lopez-Aguilera, and Ilker Demirkol, Evolutionary 4G/5G Network Architecture Assisted Efficient Handover Signaling, IEEE Access, vol. 7, 2019, pp. 256-283 (Year: 2019).*

(Continued)

*Primary Examiner* — German Viana Di Prisco
(74) *Attorney, Agent, or Firm* — Edell, Shapiro & Finnan, LLC

(57) ABSTRACT

A mechanism is provided to ensure the same user plane anchor point is selected as a User Equipment (UE) moves across multiple access networks. The selected User Plane Function (UPF) identifier information, such as a Fully Qualified Domain Name (FQDN) is passed to the UE anchor points. This will allow the UE anchor points to exchange the already selected user plane information so that the new UE anchor point can choose the same UPF.

20 Claims, 6 Drawing Sheets

(56) References Cited

U.S. PATENT DOCUMENTS

2020/0204984 A1    6/2020   Dodd-Noble et al.
2020/0260370 A1    8/2020   Nithiyanantham et al.

OTHER PUBLICATIONS

Emre Gures, Ibraheem Shayea, Abdulraqeb Alhammadi, Mustafa Ergen, and Hafizal Mohamad, A Comprehensive Survey on Mobility Management in 5G Heterogeneous Networks: Architectures, Challenges and Solutions, IEEE Access, vol. 8, 2020, pp. 195883-195913 (Year: 2020).*

3GPP TS 23.502 Version 15.4.1 Release 15, Mar. 2019, pp. 142-146 (Year: 2019).*

* cited by examiner

SELECTION OF SAME USER PLAN FUNCTION FOR USER EQUIPMENT MOVEMENT ACROSS MULTIPLE ACCESS NETWORKS

TECHNICAL FIELD

The present disclosure relates to mobile network communications.

BACKGROUND

Control Plane and User Plane separation (CUPS), first introduced by 3GPP in Release 14 specification, decouples the control and user plane functions of a core telecommunications network. With the CUPS architecture, operation, scaling and independent enhancement of control plane functionality and user plane functionality are possible.

A User Plane Function (UPF), first introduced as an extension of existing 4G user plane function like Packet Data Gateway-User Plane (PGW-U) and Serving Gateway User Plane (SGW-U), is a fundamental component of a 5G network. A UPF acts as an interconnect point between mobile infrastructure (Radio Access Network (RAN)) and the Data Network (DN). The General Packet Radio Service Tunneling User Plane (GTP-U) protocol is a tunneling protocol for a 4G user plane gateway, and is accepted by 3GPP as data plane protocol for interconnecting RAN, User Plane (UP) and DN in 5G network.

DESCRIPTION OF EXAMPLE EMBODIMENTS

Overview

Figure 1:
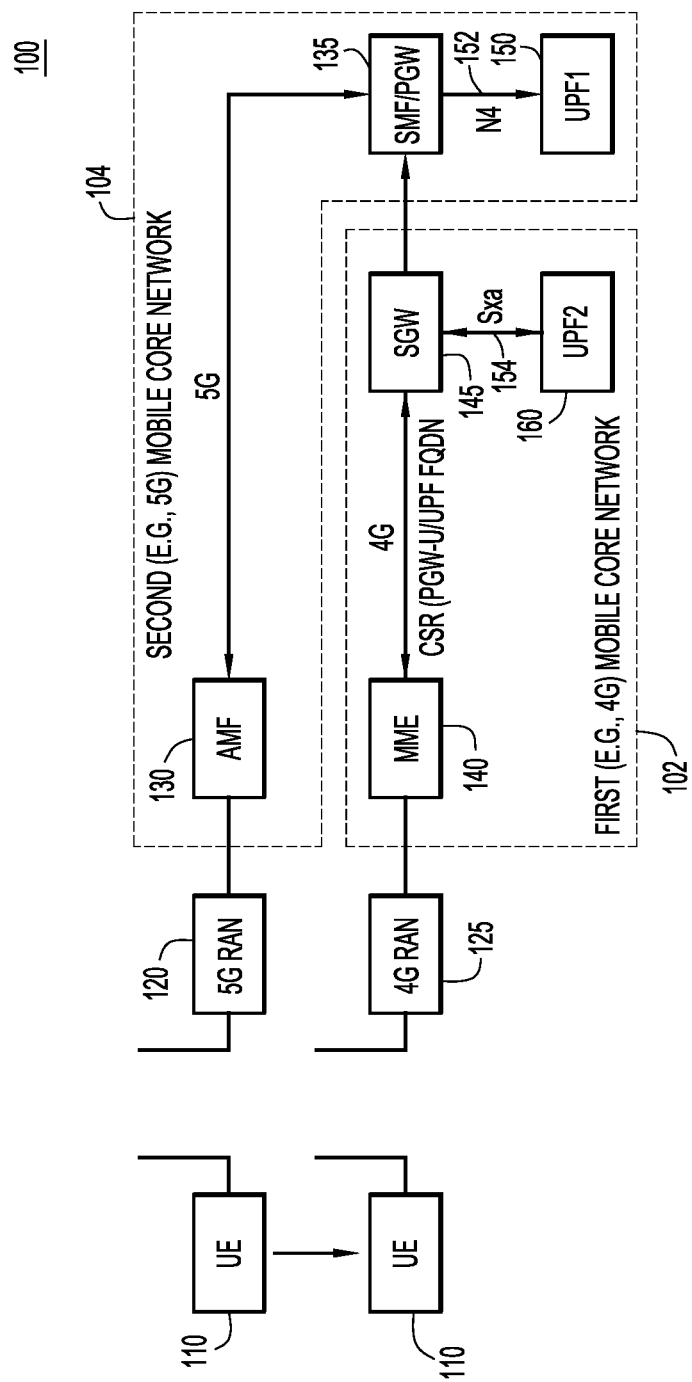
FIG. 1 is a diagram of a network environment and illustrating existing mechanisms to handle user plane function selection when a user equipment moves across access networks.

In accordance with an example embodiment, a mechanism is provided to ensure the same user plane anchor point is selected as a User Equipment (UE) moves across multiple access networks. The selected User Plane Function (UPF) identifier information, such as a Fully Qualified Domain Name (FQDN) is passed to the UE anchor points. This will allow the UE anchor points to exchange the already selected user plane information so that the new UE anchor point can choose the same UPF.

In more general terms, in one form, a method is provided that includes operations performed by a first mobility management node in a first mobile core network associated with a first access network. The method includes obtaining from a second mobility management node in a second mobile core network associated with a second access network, a message indicating that a user equipment being served by the second access network has moved to the first access network. The method involves detecting presence in the message of identifier information of a user plane function that had been used for traffic associated with user equipment when served by the second access network. The method includes, based on presence of the identifier information, providing to a gateway node in the first mobile core network, a create session request message that includes the identifier information of the user plane function so as to cause the gateway node to select, for traffic associated with the user equipment in the first access network, the user plane function for traffic associated with user equipment when served by the first access network.

Example Embodiments

Emergence of Mobile Edge Computing (MEC) demands that a UPF be closer to the network edge, increasing bandwidth and lowering latency while reducing network resources. The 5G network also allows multiple access technology (4G radios etc.) to connect to the core network. This would involve an approach where there is a converged user plane which can serve multiple access network. In absence of this, the data packet will be forwarded between multiple User Planes (UPs) as the User Equipment (UE) moves from one network to other network e.g., a 5G to 4G handover.

If the PGW-U, SGW-U and UPF are not converged in a single UP function, then multiple data path hops would be required before a Packet Data Unit (PDU) is sent over the DN. The control function (SGW-C, PGW-C and Session Management Function (SMF)) would have to control multiple UP functions for a given PDU session which would add to the complexity of the control plane network functions. Roaming across multiple access networks and MEC use cases are also challenging in a non-converged UP approach.

With the introduction of CUPS, the SGW function is split into SGW-C and SGW-U and similarly the PGW function is split into PGW-C and PGW-U. In 5G networks, the SMF and UPF perform control plane functions and user plane functions, respectively.

UP functions are controlled by a CP function using Sx interfaces (Sxa, Sxb or N4) which are defined in 3GPP Technical Specification (TS) 29.244. As per standard, a single node of a UP function can be controlled by multiple CP functions. This means a single UP should be able to handle multiple Sx (Sxa, Sxb or N4) interfaces for a given PDU session.

Current 3GPP standards (3GPP TS 29.274) attempt to address this issue by introducing a SGW-U node name Information Element (IE) in the Create Session Request message to help with combined SGW-U and PGW-U/UPF selection. However, the current solution defined in the 3GPP Specification only allows for selecting the same SGW-U and PGW-U/UPF during Initial Attach Scenarios. There are still gaps in handover scenarios where the SGW or Mobility Management Entity (MME) is not aware of a selected PGW-U.

In the current architecture, selection of the same SGW-U and PGW-U/UPF is not possible in the following scenarios.

5G to 4G inter Radio Access Technology (RAT) handover with N26 interface (idle mode or not)

5GS to Evolved Packet System (EPS) mobility without N26 interface

SGW relocation

There is no mechanism to pass the information of an already selected PGW-u/UPF to the SGW. As a result, after handover to a new access network, e.g., from 5G to 4G, the MME will not be aware of a selected UPF address. In such cases, the new mobility anchor point, e.g., the MME, could do a fresh selection of a PGW-u/UPF, which could be different from the previously selected UPF.

The diagram of FIG. 1 illustrates one such example where a 5G to 4G handover scenario is shown. FIG. 1 shows a networking environment 100 that includes interactions between elements in a first (e.g., 4G) mobile core network 102 and elements in a second (e.g., 5G) mobile core network 104. A UE 110 is shown that is attached to the 5G access network, via a 5G Radio Access Network (RAN) 120 and then hands over to the 4G network, via 4G RAN 125.

The 5G mobile core network elements include an Access and Mobility Management Function (AMF) 130, and Session Management Function/SMF combined with a Packet Data Network Gateway (PGW), denoted SMF/PGW 135. The 4G mobile core network elements include a Mobility Management Entity (MME) 140 and a Serving Gateway (SGW) 145. The MME 140 communicates with the SGW 145 and provides a Fully Qualified Domain Name (FQDN) to the PGW-U/UPF to be used for 4G user plane traffic associated with the UE 110. The FQDN is included in a response sent by the SGW 145 to a Create Session Request (CSR) sent by the MME 140.

In addition, the 5G mobile core network 104 includes a first User Plane Function (UPF1) 150. The SMF/PGW 135 is in communication with a first User Plane Function (UP1) 150 via the N4 interface 152. The 4G mobile core network 102 includes a second UPF (UPF2) 160. The SGW 145 is in communication with UPF2 160 via the Sxa interface 154. Thus, UPF1 150 is used for the UE 110 when the UE 110 is connected to the 5G network, and UPF2 160 is used for the UE 110 when the UE 110 is connected to the 4G network.

If the SGW 145 and the SMF/PGW 135 are using two different UPFs, then the User Plane cannot optimize the data path for the UE 110. The additional hop in the data path would ultimately add to the overall latency associated with traffic for the UE 110.

Figure 2:
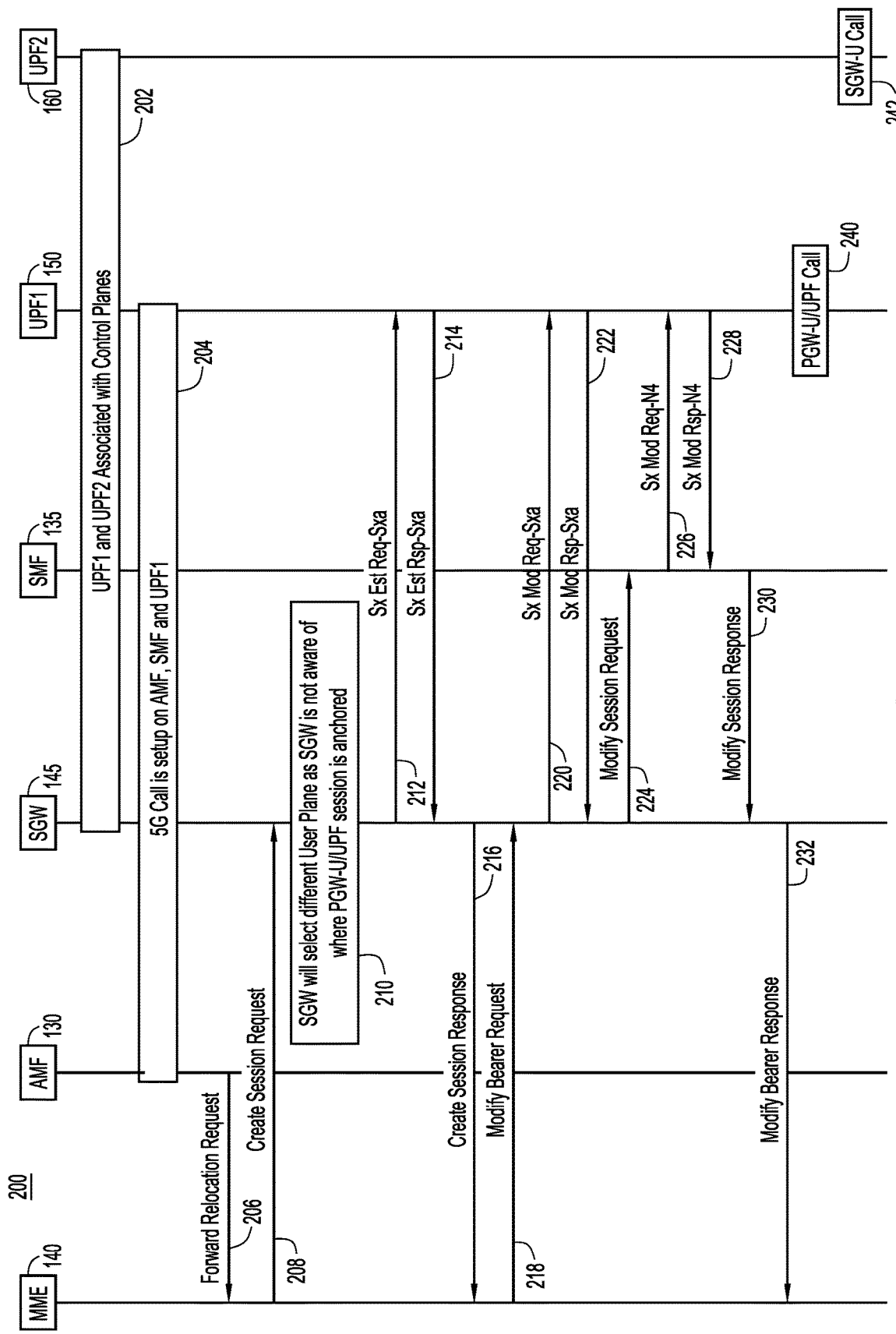
FIG. 2 illustrates a call flow diagram of a process to support the mechanisms shown in FIG. 1.

FIG. 2 illustrates a call flow 200 for a 5G to 4G handover (using the N26 interface) in the current architecture, leading to selection of two different UPFs, as indicated in the scenario depicted in FIG. 1. At 202, UPF1 150 and UPF2 160 are associated with control planes in their respective 4G and 5G mobile networks. At 204, a 5G call/session is set up on the AMF 130, SMF 135 and UPF1 150.

Some time after the call/session is set up on the 5G network, at 206, the AMF 130 forwards a relocation request to the MME 140, indicating that the UE has moved to the 4G network. The MME 140, at 208, sends a Create Session Request to the SGW 145. As shown at 210, the SGW 145 will select a different UPF (e.g., UPF2 160) because the SGW 145 is not aware of where the PGW-U/UPF session for the UE is anchored.

At 212 and 214, the SGW 145 and UPF2 160 engage in an Sxa session establishment. The SGW 145 then sends a Create Session Response to the MME 140, at 216, indicating selection of UPF2 160.

At 218, the MME 140 sends a Modify Bearer Request to the SGW 145, indicating need to change context of the session from 5G to 4G. At 220, the SGW 145 sends an Sx modify request message to the UPF2 160, and at 22, the UPF2 160 responds with an Sx modify response.

The SGW 145, at 224, sends a modify session request to the SMF 135, to indicate that the session is going to be moved to a 4G UP element. At 226, the SMF 135 sends an Sx modify request message over the N4 interface, to the UPF1 150 indicating that the session for the UE is to be moved to UPF2 160. At 228, the UPF1 150 responds to acknowledge the change. The SMF 135, at 230, sends a modify session response message to the SGW 145. The SGW 145 then sends a modify bearer response to the MME 140.

Thus, as shown at 240, UPF1 150 is used for PGW-U/UPF session when the UE is in being served by the 5G network, and as shown at 242, the UPF2 160 is used for the SGW-U session when the UE is being served by the 4G network.

To ensure the same user plane anchor point is selected as the UE moves across multiple access networks, the selected UP FQDN information is passed to the UE anchor points (MME, SGW-C, AMF). This will allow the UE anchor points to exchange the already selected UP information so that the new UE anchor point can choose the same UPF.

Figure 3:
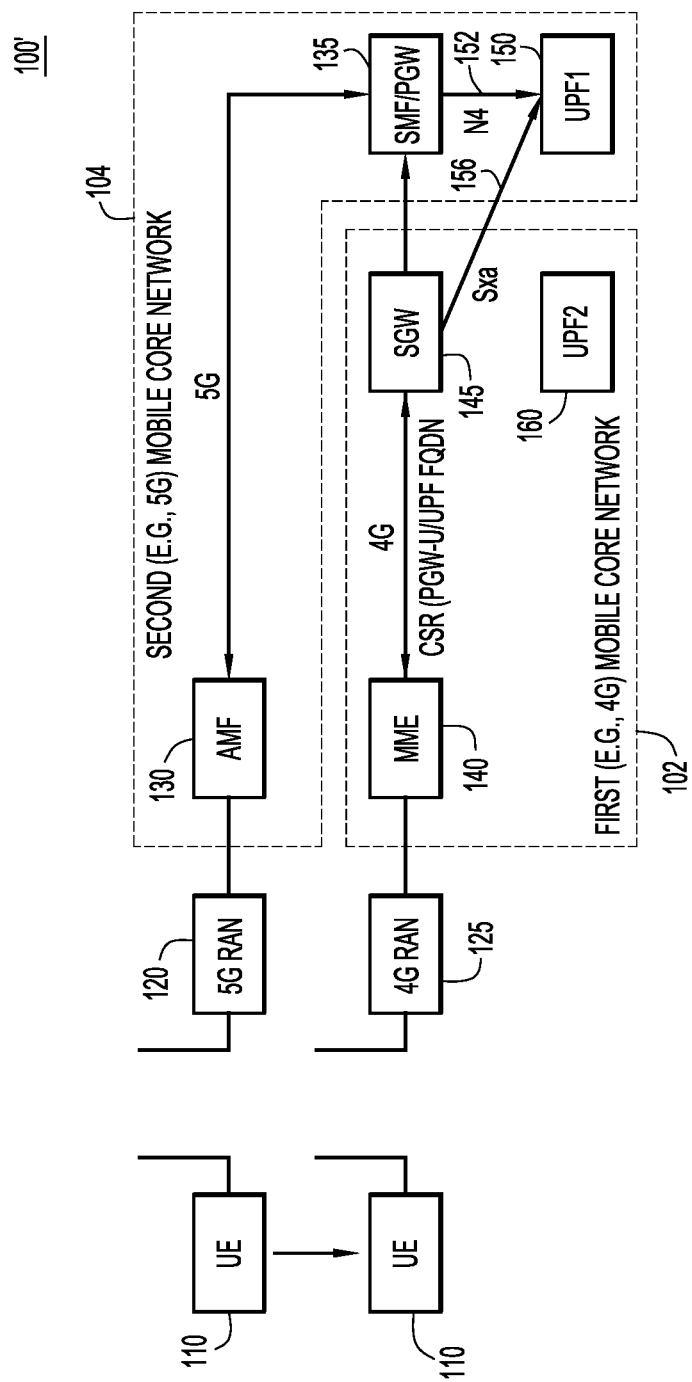
FIG. 3 is a diagram of a network environment, similar to FIG. 1, but depicting a mechanism to select the same user plane function when a mobile device roams across access networks, according to an example embodiment.

FIG. 3 illustrates a network environment 100' that is similar to the network environment 100, except that the same UPF, e.g., UPF1 150, is selected for use when a UE had been connected to one access network, e.g., the 5G network, and relocates to another network, e.g., the 4G network. This is shown by virtue of the Sxa interface 156 from the SGW 145 to the UPF1 150. The SMF/PGW 135 still has the N4 interface 152 to the UPF1 150.

Figure 4:
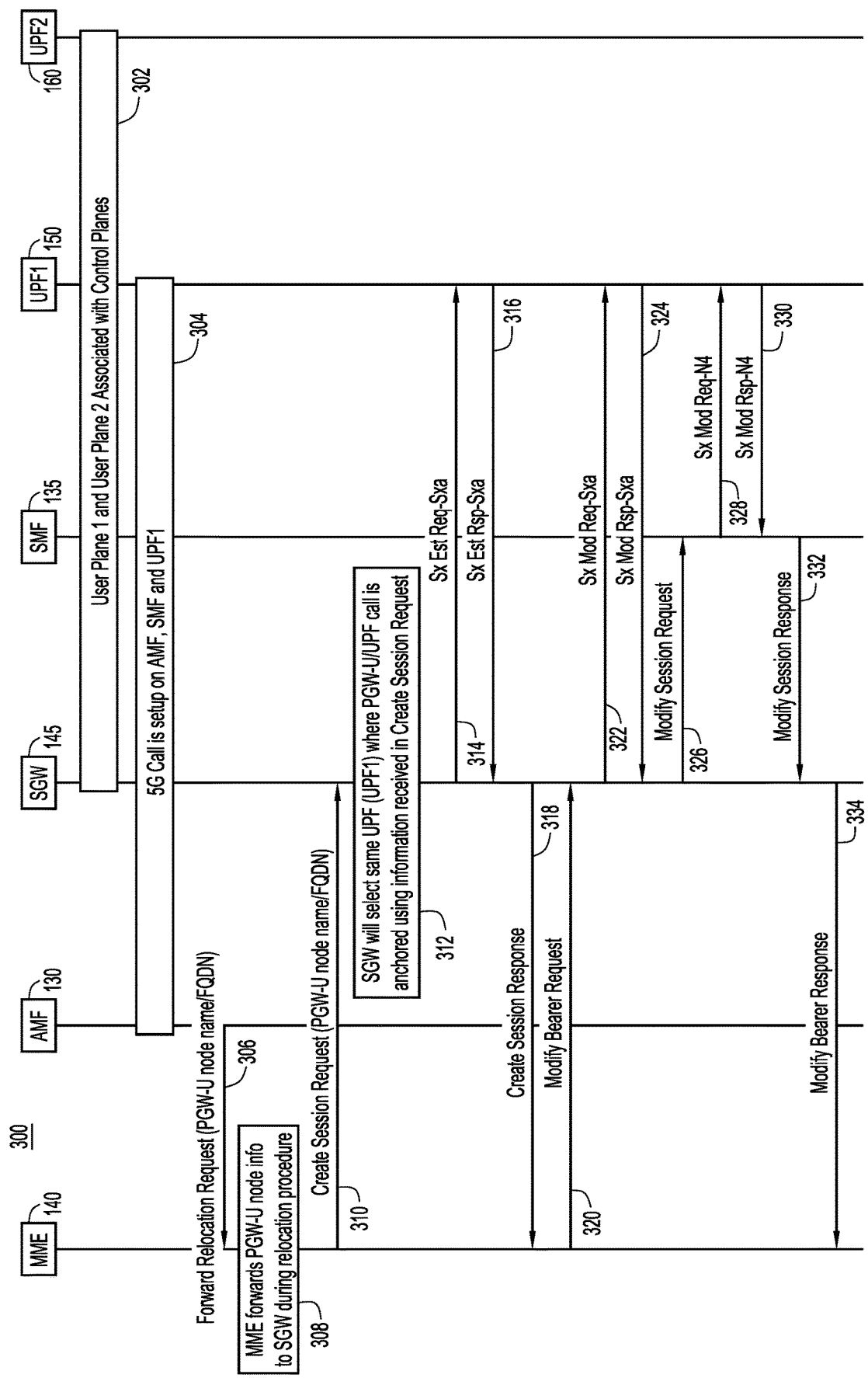
FIG. 4 is a detailed call flow diagram depicting the operations to select the same user plane function when a mobile device roams across access networks, according to an example embodiment.

Reference is now made to FIG. 4, which illustrates a call flow for a process 300 that allows selection of the same UPF for 5G to 4G handover (using the N26 interface, for example) and other similar scenarios. As shown in FIG. 4, the process 300 involves associated UPF1 150 and UPF2 160 with their respective control planes, as shown at 302. A 5G call/session is set up on the AMF, SMF and UPF1 150, as shown at 304.

At 306, the AMF 130 forwards a relocation request to the MME 140. The relocation request includes the PGW-U node name/FQDN associated with UPF1 150. Thus, the AMF 130 passes the PGW-U address to the MME 140 at operation 306. As shown at 308, the MME forwards the user plane node name information (PGW-U node information) to the SGW during a relocation procedure.

Specifically, at 310, the MME 140 sends to the SGW 145 a create session request that includes the PGW-U node name information (e.g., FQDN). The SGW 145, at 312, selects the same UPF (UPF1 150) where the PGW-U/UPF call/session is anchored using information received in the create session request received from the MME 140 at 310.

At 314 and 316, the SGW 145 and UPF1 150 engage in Sx session establishment. The SGW 145 sends an Sx establishment request message over the Sxa interface to UPF1 150 at 314. The UPF1 150 responds with an Sx establishment response message to the SGW 145, at 316. Next, the SGW 145 sends a create session response to the MME 140, at 318.

At 320, the MME 140 sends a modify bearer request to the SGW 145. The SGW 145 sends an Sx modification request to the UPF1 150 over the Sxa interface, at 322. The UPF1 150 responds with an Sx modification response to the SGW 145, at 324.

At 326, the SGW 145 sends a modify session request to the SMF 135. The SMF 135, at 328, sends an Sx modification request over the N4 interface to UPF1 150. The UPF1 150 responds with an Sx modification response over the N4 interface to the SMF 135, at 330.

The SMF 135, at 332, then sends a modify session response to the SGW 145, which is responsive to the modify session request sent at 326. The SGW 145 then sends, at 334, a modify bearer response, to the MME 140, which is responsive to the modify bearer request sent at 320.

To ensure that SGW 145 selects the same UPF (e.g., UPF1 15) as the PGW-U/UPF during handover (5G-4G/Relocation), new IEs are provided on several interfaces in the 3GPP Specifications to pass the information of selected UPF.

On the interface between the SMF 135 and the AMF 130 in the message Nsmf_PDUSessionContextResponse as part of Retrieve SM Context service operation (in step 304 of process 300), and on the interface between the MME 140 and the SGW 145 in the create session request message (in step 310 of process 300) in case of SGW relocation and 5G to 4G handover:

| PGW-U/UPF node name | The MME includes this IE on the S11 interface, if available. | FQDN |
|---|---|---|

On the interface between the MME 140 and the SGW 145 in the create session response and on the interface between the SGW 145 and the SMF/PGW 135 in create session Response for Initial Attach operational sequence:

| PGW-U/UPF node name | The SGW-C/PGW-C/SMF includes this IE on the S11/S5 interface, if available. | FQDN |
|---|---|---|

On the interface between the MME 140 and AMF 130 in context response in case of 5G to 4G handover:

| PGW-U/UPF node name | The AMF includes this IE on the N26 interface, if available. | FQDN |
|---|---|---|

On the interface between a Source MME to a Target MME in a forward relocation request message for a SGW relocation scenario:

| PGW-U/UPF node name | The AMF shall include this IE on the N26 interface, if available. | FQDN |
|---|---|---|

Figure 5:
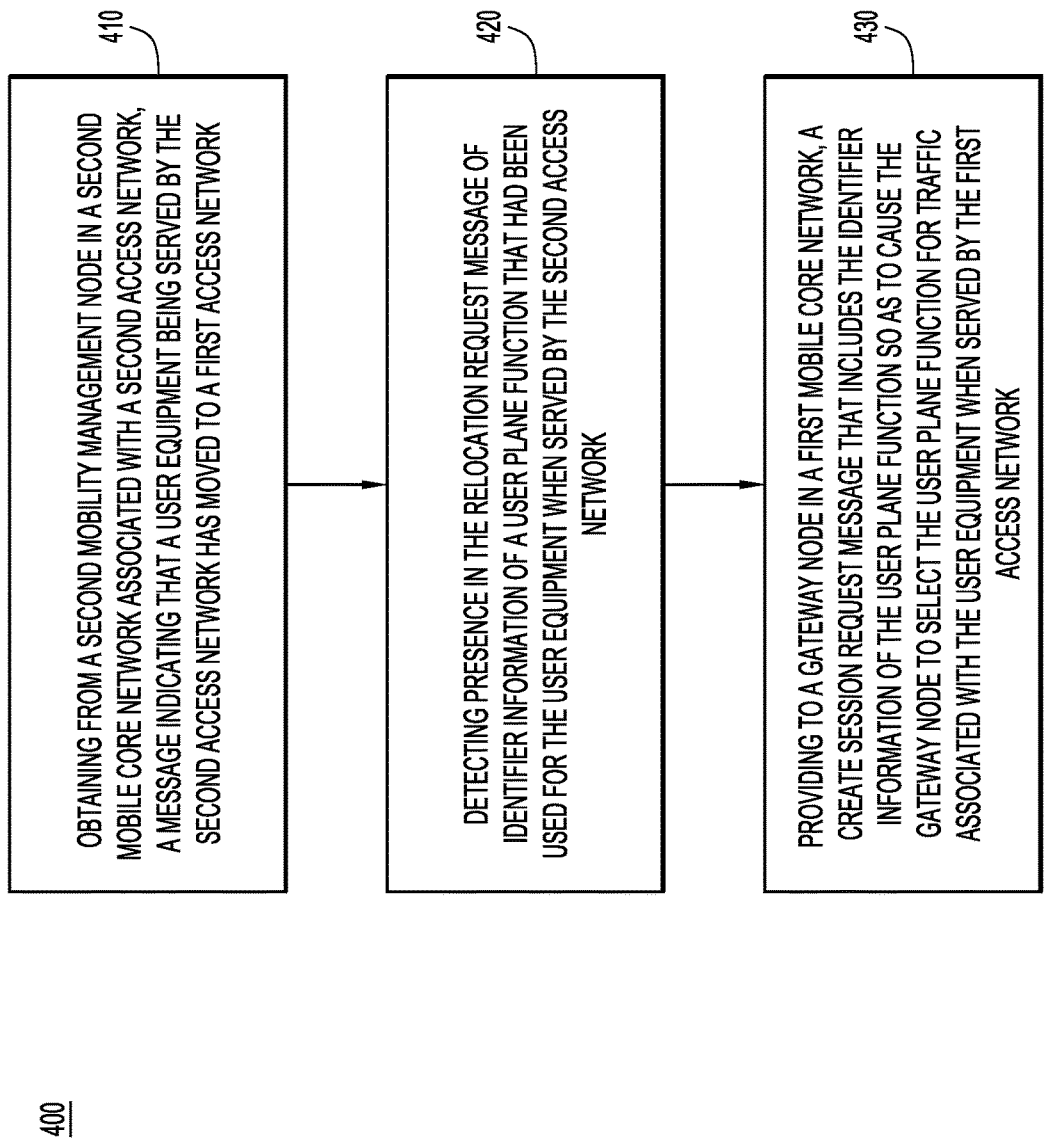
FIG. 5 is a flow chart depicting a method for selecting the same user plane function when a mobile device roams across access networks, according to an example embodiment.

Reference is now made to FIG. 5, which illustrates a flow chart for a method 400 that is performed by a first mobility management node in a first mobile core network, such as the MME 140 in the 4G mobile core network 102. At 410, the method 400 includes obtaining from a second mobility management node in a second mobile core network associated with a second access network, a message indicating that a user equipment being served by the second access network has moved to the first access network. The message may include identifier information of a user plane function that had been used for traffic associated with user equipment when served by the second access network. In one example, the message is a relocation request message that is sent as part of a relocation procedure associated with the user equipment relocating from the second access network to the first access network. The second mobility management node in the second mobile core network may be an AMF. In general, a mobility management node may be an MME or similar node or function, or an AMF or similar node or function, or a node that performs a combination of functions of an MME and AMF.

At 420, the method 400 includes detecting presence in the relocation request message of the identifier information of the user plane function that had been used for traffic associated with user equipment when served by the second access network.

At 430, the method 400 includes, based on presence of the identifier information, providing to a gateway node in the first mobile core network, a create session request message that includes the identifier information of the user plane function. The identifier information included in the create session request message causes the gateway node to select, for traffic associated with the user equipment in the first access network, the user plane function for traffic associated with user equipment when served by the first access network. The gateway node in the first mobile core network may be an SGW, for example.

The providing operation 430 may include providing the identifier information in an information element of the create session request message on an S11 interface between the first mobility management node and the gateway node in the first mobile core network. In one form, the information element is a packet data network gateway-user plane/user plane function node name information element. In one form, the identifier information is a Fully Qualified Domain Name associated with the user plane function.

Thus, the method 400 ensures that the same user plane function that had been used for the user equipment when served by a second access network is used for traffic associated with the user equipment when it relocates and is served by a first access network.

As explained above, in one example, the first mobile core network is a fourth generation (4G) mobile core network, the first access network is a 4G access network, the second mobile core network is a fifth generation (5G) mobile core network, the second access network is a 5G access network, and wherein the message indicates that the user equipment has handed over from the 5G access network to the 4G access network. In another example, the first mobile core network type is a fifth generation (5G) mobile core network and the second mobile core network is a fifth generation (5G) mobile core network. Thus, the move/handover could be from a 4G network to a 5G network. In still another example, the first mobile core network is a fourth generation (4G) mobile core network, the first access network is a 4G inter Radio Access Technology (RAT) access network, the second mobile core network is a fifth generation (5G) mobile core network, the second access network is a 5G access network, and the message indicates that the user equipment has handed over from the 5G access network to the 4G inter RAT access network.

In addition, the identifier information of the user plane function is contained in a message received by the second mobility management node from a session management node/function in the second mobile core network, during session establishment for the user equipment in the second mobile core network. As described above, the message may be a relocation request message sent as part of a relocation procedure associated with the user equipment relocating from the second access network to the first access network.

The mechanism presented herein has several advantages.
1. Elimination of extra UPF and GTP-U tunnel on N9 interface between UPFs. This can help in reducing the overall packet latency and operations expense for an operator.
2. Elimination of context sharing between two different anchor points by merging them into one.

3. Simplified network architecture and resource saving by removing additional GTP-U tunnel.

These techniques satisfy a need in the existing 3GPP architecture with respect to choosing the same UPF for a mobile device that is roaming into multiple access networks (5G, 4G). This mechanism guarantees selection of the same user plane PDU anchor point for a device which is roaming across multiple access networks (be it 3GPP access, such as 5G New Radio (NR), Long Term Evolution (LTE), etc., or a non-3GPP access network). This simplifies the overall network architecture and also helps in improving overall packet latency and network resources by saving an additional GTP-U tunnel between two UP functions (over an N9 interface in the 5G mobile core network).

Figure 6:
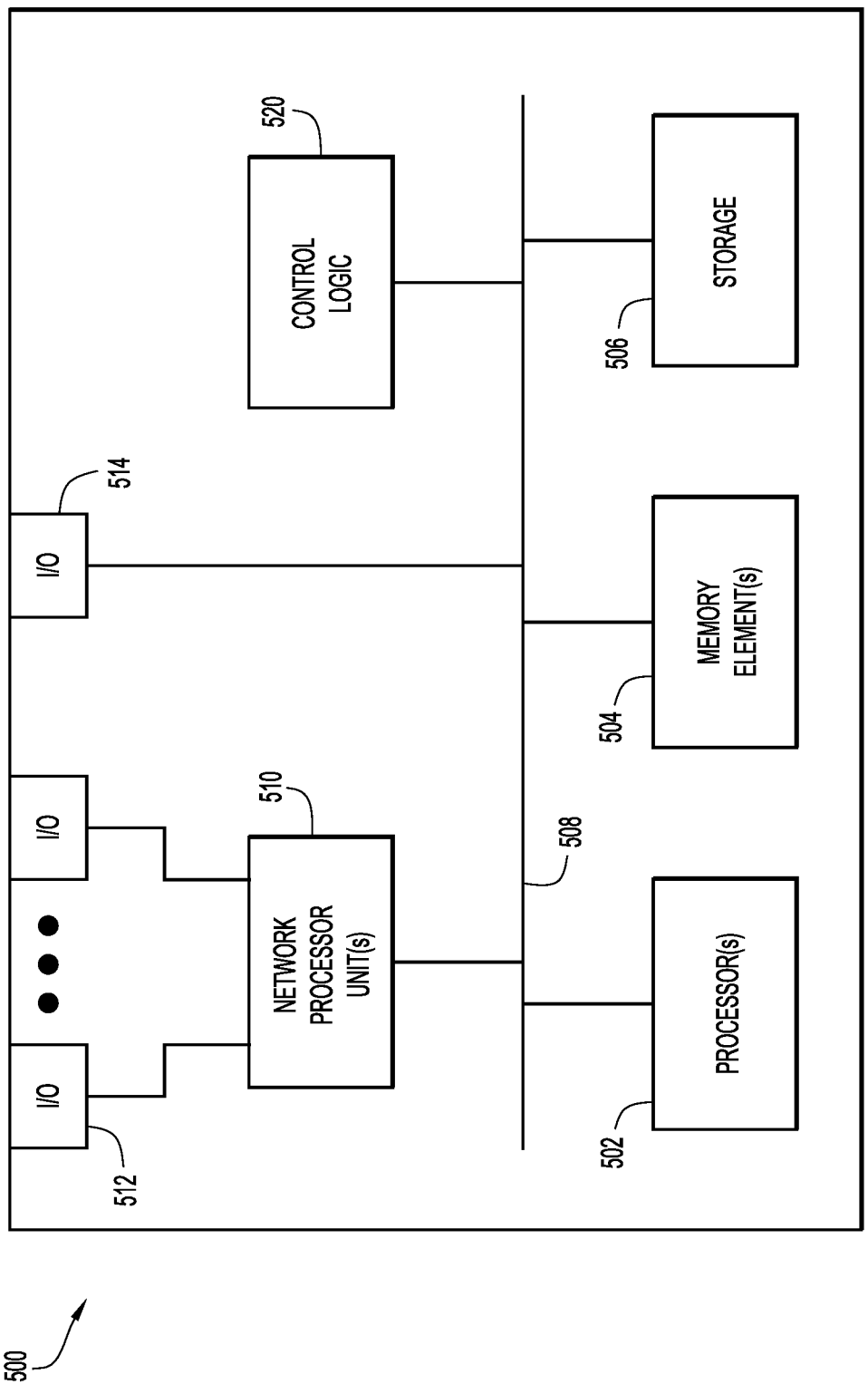
FIG. 6 is a hardware block diagram of a computing device that may be configured to perform the techniques presented herein, according to an example embodiment.

Referring to FIG. 6, a hardware block diagram is provided of a computing device 500 that may perform functions associated with operations described herein in connection with the FIGS. 3-5. In various embodiments, a computing device, such as computing device 500 or any combination of computing devices 500, may be configured as any entity/entities as discussed for the techniques depicted in connection with FIGS. 3-5 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in one form, a method is provided comprising: at a first mobility management node in a first mobile core network associated with a first access network: obtaining from a second mobility management node in a second mobile core network associated with a second access network, a message indicating that a user equipment being served by the second access network has moved to the first access network; detecting presence in the message of identifier information of a user plane function that had been used for traffic associated with user equipment when served by the second access network; and based on presence of the identifier information, providing to a gateway node in the first mobile core network, a create session request message that includes the identifier information of the user plane function so as to cause the gateway node to select, for traffic associated with the user equipment in the first access network, the user plane function for traffic associated with user equipment when served by the first access network.

In another form, an apparatus is provided comprising: a network interface configured to enable network communications; and a processor coupled to the network interface, and configured to operate a first mobility management node in a first mobile core network associated with a first access network, and to perform operations including: obtaining from a second mobility management node in a second mobile core network associated with a second access network, a message indicating that a user equipment being served by the second access network has moved to the first access network; detecting presence in the message of identifier information of a user plane function that had been used for traffic associated with user equipment when served by the second access network; and based on presence of the identifier information, providing to a gateway node in the first mobile core network, a create session request message that includes the identifier information of the user plane function so as to cause the gateway node to select, for traffic associated with the user equipment in the first access network, the user plane function for traffic associated with user equipment when served by the first access network.

In still another form, provided are one or more non-transitory computer readable storage media encoded with instructions that, when executed by at least one processor on behalf of a first mobility management node in a first mobile core network associated with a first access network, cause the at least one processor to perform operations including: obtaining from a second mobility management node in a second mobile core network associated with a second access network, a message indicating that a user equipment being served by the second access network has moved to the first access network; detecting presence in the message of identifier information of a user plane function that had been used for traffic associated with user equipment when served by the second access network; and based on presence of the identifier information, providing to a gateway node in the first mobile core network, a create session request message that includes the identifier information of the user plane function so as to cause the gateway node to select, for traffic associated with the user equipment in the first access network, the user plane function for traffic associated with user equipment when served by the first access network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a first mobility management node in a first mobile core network associated with a first access network:
   obtaining from a second mobility management node in a second mobile core network associated with a second access network, a message indicating that a user equipment being served by the second access network has moved to the first access network;
   detecting presence in the message of identifier information of a user plane function that had been used for traffic associated with user equipment when served by the second access network; and
   based on presence of the identifier information, providing to a gateway node in the first mobile core network, a create session request message that includes the identifier information of the user plane function so as to cause the gateway node to select, for traffic associated with the user equipment in the first access network, the user plane function for traffic associated with user equipment when served by the first access network.

2. The method of claim 1, wherein the first mobile core network is a fourth generation (4G) mobile core network, the first access network is a 4G access network, the second mobile core network is a fifth generation (5G) mobile core network, the second access network is a 5G access network, and wherein the message indicates that the user equipment has handed over from the 5G access network to the 4G access network.

3. The method of claim 1, wherein the identifier information of the user plane function is contained in a message received by the second mobility management node from a session management node in the second mobile core network.

4. The method of claim 1, wherein the message is a relocation request message sent as part of a relocation procedure associated with the user equipment relocating from the second access network to the first access network.

5. The method of claim 1, wherein providing includes providing the identifier information in an information element of the create session request message on an S11 interface between the first mobility management node and the gateway node in the first mobile core network.

6. The method of claim 5, wherein the information element is a packet data network gateway-user plane/user plane function node name information element.

7. The method of claim 5, wherein the identifier information is a Fully Qualified Domain Name associated with the user plane function.

8. The method of claim 1, wherein the first mobile core network is a fifth generation (5G) mobile core network and the second mobile core network is a fourth generation (4G) mobile core network.

9. An apparatus comprising:
a network interface configured to enable network communications; and
a processor coupled to the network interface, and configured to operate a first mobility management node in a first mobile core network associated with a first access network, and to perform operations including:
obtaining from a second mobility management node in a second mobile core network associated with a second access network, a message indicating that a user equipment being served by the second access network has moved to the first access network;
detecting presence in the message of identifier information of a user plane function that had been used for traffic associated with user equipment when served by the second access network; and
based on presence of the identifier information, providing to a gateway node in the first mobile core network, a create session request message that includes the identifier information of the user plane function so as to cause the gateway node to select, for traffic associated with the user equipment in the first access network, the user plane function for traffic associated with user equipment when served by the first access network.

10. The apparatus of claim 9, wherein the first mobile core network is a fourth generation (4G) mobile core network, the first access network is a 4G access network, the second mobile core network is a fifth generation (5G) mobile core network, the second access network is a 5G access network, and wherein the message indicates that the user equipment has handed over from the 5G access network to the 4G access network.

11. The apparatus of claim 9, wherein the first mobile core network is a fourth generation (4G) mobile core network, the first access network is a 4G inter Radio Access Technology (RAT) access network, the second mobile core network is a fifth generation (5G) mobile core network, the second access network is a 5G access network, and the message indicates that the user equipment has handed over from the 5G access network to the 4G inter RAT access network.

12. The apparatus of claim 9, wherein the identifier information of the user plane function is contained in a message received by the second mobility management node from a session management node in the second mobile core network.

13. The apparatus of claim 9, wherein the message is a relocation request message sent as part of a relocation procedure associated with the user equipment relocating from the second access network to the first access network.

14. The apparatus of claim 9, wherein the processor is configured to provide the identifier information in an information element of the create session request message on an S11 interface between the first mobility management node and the gateway node in the first mobile core network.

15. The apparatus of claim 14, wherein the information element is a packet data network gateway-user plane/user plane function node name information element.

16. The apparatus of claim 14, wherein the identifier information is a Fully Qualified Domain Name associated with the user plane function.

17. One or more non-transitory computer readable storage media encoded with instructions that, when executed by at least one processor on behalf of a first mobility management node in a first mobile core network associated with a first access network, cause the at least one processor to perform operations including:
obtaining from a second mobility management node in a second mobile core network associated with a second access network, a message indicating that a user equipment being served by the second access network has moved to the first access network;
detecting presence in the message of identifier information of a user plane function that had been used for traffic associated with user equipment when served by the second access network; and
based on presence of the identifier information, providing to a gateway node in the first mobile core network, a create session request message that includes the identifier information of the user plane function so as to cause the gateway node to select, for traffic associated with the user equipment in the first access network, the user plane function for traffic associated with user equipment when served by the first access network.

18. The non-transitory computer readable storage media of claim 17, wherein the first mobile core network is a fourth generation (4G) mobile core network, the first access network is a 4G access network, the second mobile core network is a fifth generation (5G) mobile core network, the second access network is a 5G access network, and wherein the message indicates that the user equipment has handed over from the 5G access network to the 4G access network.

19. The non-transitory computer readable storage media of claim 17, wherein the instructions further cause the processor in the first mobility management node to provide the identifier information in an information element of the create session request message on an S11 interface between the first mobility management node and the gateway node in the first mobile core network.

20. The non-transitory computer readable storage media of claim 17, wherein the identifier information is a Fully Qualified Domain Name associated with the user plane function.

* * * * *